(12) United States Patent
Panse et al.

(10) Patent No.: US 8,722,145 B2
(45) Date of Patent: *May 13, 2014

(54) THERMALLY PROTECTIVE MATERIALS

(75) Inventors: Dattatreya Panse, Lincoln University, PA (US); Klaus Meindl, Putzbrunn (DE)

(73) Assignee: W. L. Gore & Associates, Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/869,297

(22) Filed: Aug. 26, 2010

(65) Prior Publication Data

US 2010/0319850 A1 Dec. 23, 2010

Related U.S. Application Data

(62) Division of application No. 11/923,111, filed on Oct. 24, 2007, now abandoned.

(51) Int. Cl.
*B05D 5/00* (2006.01)

(52) U.S. Cl.
USPC .............. 427/288; 427/256; 252/62; 442/138

(58) Field of Classification Search
USPC ............. 427/256, 288; 156/327, 333; 252/62; 442/138
See application file for complete search history.

(56) References Cited

U.S. PATENT DOCUMENTS

| | | |
|---|---|---|
| 3,574,644 A | 4/1971 | Olstowski et al. |
| 4,194,041 A | 3/1980 | Gore et al. |
| 4,532,316 A | 7/1985 | Henn |
| 4,862,730 A | 9/1989 | Crosby |
| 4,945,015 A | 7/1990 | Milner et al. |
| 5,227,230 A * | 7/1993 | McGlade .................. 428/319.1 |
| 5,258,216 A | 11/1993 | von Bonin et al. |
| 5,286,216 A | 2/1994 | Volz |
| 5,401,793 A | 3/1995 | Kobayashi et al. |
| 5,418,054 A | 5/1995 | Sun |
| 5,645,926 A | 7/1997 | Horrocks et al. |
| 5,760,115 A | 6/1998 | Okisaki et al. |
| 5,811,359 A | 9/1998 | Romanowski |
| 5,952,248 A | 9/1999 | Horton |
| 6,096,416 A | 8/2000 | Altenberg |
| 6,287,686 B1 | 9/2001 | Huang et al. |
| 6,667,255 B2 | 12/2003 | Hexels |

(Continued)

FOREIGN PATENT DOCUMENTS

CN  102210388  7/2008
DE  3625080  1/1998

(Continued)

OTHER PUBLICATIONS

International Search Report and Written Opinion, PCT/US2010/001265, Jul. 8, 2010, 11 pages.

(Continued)

*Primary Examiner* — Michael Wieczorek
*Assistant Examiner* — Xiao Zhao
(74) *Attorney, Agent, or Firm* — Amy L. Miller

(57) ABSTRACT

A mixture comprising an expandable graphite and a polymer resin is described wherein the polymer resin-expandable graphite mixture has a volume increase and structural integrity after exposure to heat. Methods are described for increasing the thermal protective performance (TPP) of textiles and laminates while optionally maintaining comfort, flexibility, and liquid protective properties.

31 Claims, 10 Drawing Sheets

(56) References Cited

U.S. PATENT DOCUMENTS

| | | |
|---|---|---|
| 6,670,291 B1 * | 12/2003 | Tompkins et al. ............ 442/136 |
| 6,743,498 B2 | 6/2004 | Fourmeux |
| 2001/0004575 A1 | 6/2001 | Hexels |
| 2003/0035912 A1 | 2/2003 | Horacek |
| 2003/0082972 A1 | 5/2003 | Monfalcone, III et al. |
| 2003/0228812 A1 * | 12/2003 | Stanhope et al. ............... 442/49 |
| 2005/0014432 A1 * | 1/2005 | Jain et al. ......................... 442/76 |
| 2005/0095936 A1 | 5/2005 | Jones et al. |
| 2005/0137300 A1 | 6/2005 | Schlosser et al. |
| 2005/0287894 A1 | 12/2005 | Burns et al. |
| 2006/0202176 A1 * | 9/2006 | Koyama et al. ............... 252/608 |
| 2007/0009679 A1 | 1/2007 | Holcombe et al. |
| 2007/0021023 A1 | 1/2007 | Altman et al. |
| 2007/0178788 A1 | 8/2007 | Link et al. |
| 2007/0190876 A1 | 8/2007 | Ogawa et al. |

FOREIGN PATENT DOCUMENTS

| | | |
|---|---|---|
| DE | 197 18 876 | 11/1998 |
| DE | 20119602 | 5/2002 |
| EP | 1669490 | 6/2006 |
| GB | 1497118 | 1/1978 |
| JP | 08085189 | 9/1994 |
| JP | 2001214318 | 8/2001 |
| JP | 2006233347 | 9/2006 |
| JP | 2006299447 | 11/2006 |
| JP | 2007044919 | 2/2007 |
| WO | 9935926 | 7/1999 |
| WO | 01/06881 | 2/2001 |
| WO | 2009055047 | 4/2009 |

OTHER PUBLICATIONS

ASTM F1930-11 Standard Test Method for Evaluation of Flame Resistant Clothing for Protection Flash Fire Simulations Using an Instrumented Manikin (3 pages total).

W. P. Behnke, A.J. Geshury and R.L.Barker, "Thermoman" Full Scale Tests of the Thermal Protective Performance of Heat Resistant Fabrics, Proceedings of the Fourth Interntional Conference on Environmental Ergonomics Austin, TX (1990) pp. 70-71.

Nyacol Nyagraph Data Sheet; Expandable Graphite Flame Retardant Additives; Nano Technologies, Inc.; Issue 9/02 Rev 3/06; 1 page.

Sepe, M.P., Thermal Analysis of Polymers, 1997, Rapra Technology LTD., vol. 8, No. 11, pp. 23-26.

* cited by examiner

Figure 9
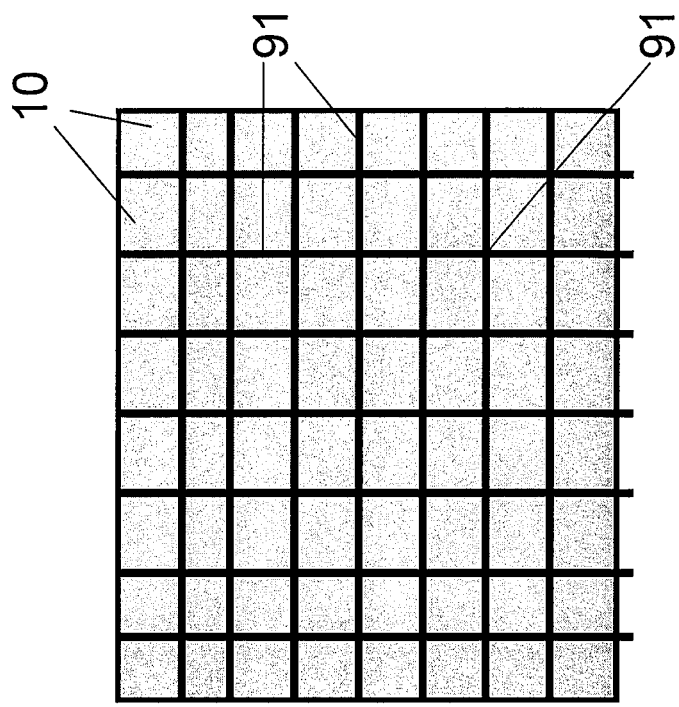
Fig. 9b
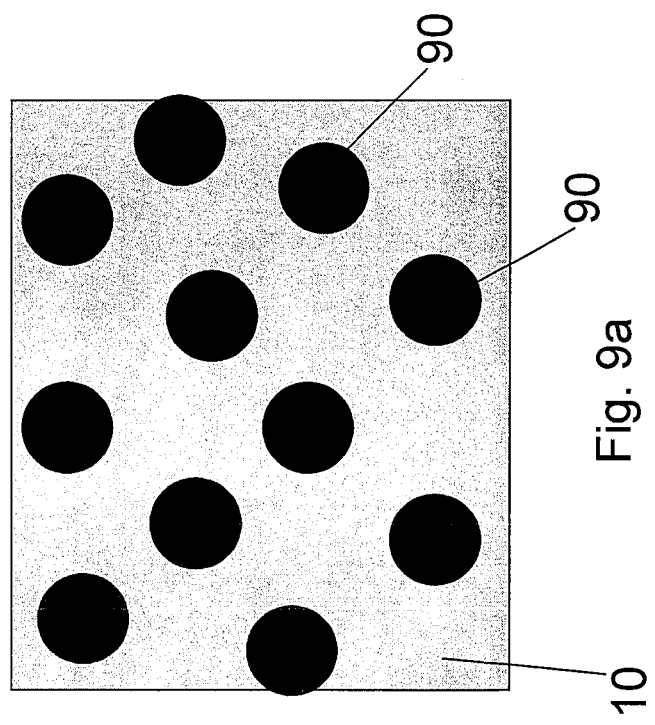
Fig. 9a

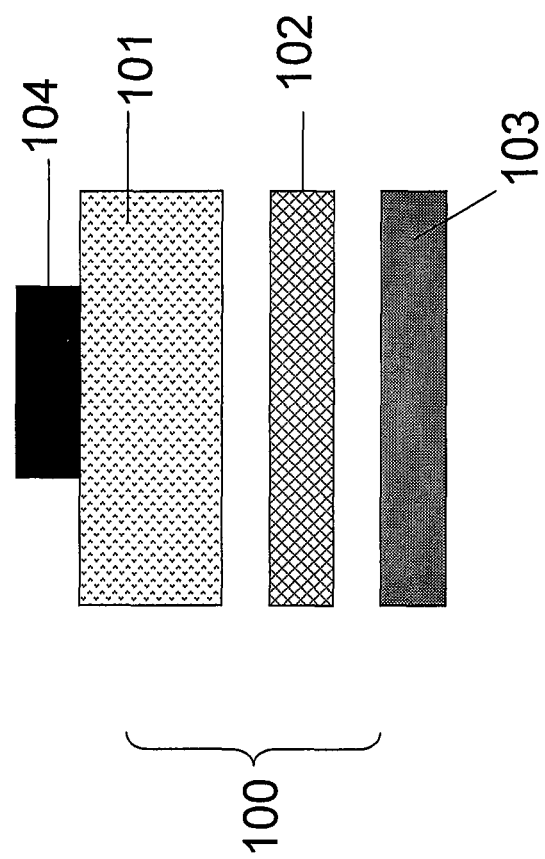

THERMALLY PROTECTIVE MATERIALS

CROSS REFERENCE TO RELATED APPLICATIONS

This application is a divisional of application U.S. Ser. No. 11/923,111, filed Oct. 24, 2007, now abandoned

BACKGROUND OF THE INVENTION

Firefighters, industrial workers, law enforcement and the like, need garments that protect them from a variety of threats. These workers need protection from extreme weather conditions, hazardous liquids, heat and flame. In particular, protection from flame requires materials that both self-extinguish and prevent burn caused by heat transfer through a garment. In addition, liquid and flame protection clothing should have a level of breathability sufficient to reduce heat stress burden to extend their ability, to perform the function or to prevent heat casualty.

A variety of flame protective materials have been developed which are self-extinguishing in character. Most notable are the meta-aramids, modacrylics, polybenzimidazole (PBI), polybenzoxazole (PBO), para-aramids, poly diimidazo pyridinylene dihydroxy phenylene (PIPD), melamine, flame resistant (FR) polyester, FR rayon, and FR cotton, to name a few. However, to provide suitable insulation (to reduce burn caused by heat transfer), most commonly thermally stable insulative layers are added. For instance, in structural firefighting, the turnout clothing is typically comprised of a thermally stable, self-extinguishing shell, a moisture barrier (to provide liquid protection), and a thermal liner (to provide insulation from heat and flame). Insulation that protects users from extremes in temperature by increasing thickness is well known. However increased insulation achieved with increased thickness tends to adversely affect the user's heat stress burden under high work rate or high heat environments.

SUMMARY

The current application describes a polymer resin-expandable graphite mixture comprising about 2 wt % to about 30 wt % of an expandable graphite and about 30 wt % to about 98 wt % of a polymer resin with a modulus between $10^3$ and $10^6$ dynes/cm$^2$ at 200° C. and Tan Delta of between 0.1 and 10 at 200° C., wherein the polymer resin-expandable graphite mixture has a minimum volume increase of at least 200% after exposure to 300° C. for 90 seconds.

Also, methods are described for increasing the thermal protective performance (TPP) of textile and laminates while optionally maintaining comfort, flexibility, and liquid protective properties. In particular, one embodiment described herein has particular advantage when it is disposed between a flame and a liquid-proof barrier.

DESCRIPTION OF THE DRAWINGS

FIG. 9a is a schematic illustration of a polymer resin-expandable graphite applied as discrete dots.

FIG. 9b is a schematic illustration of one embodiment of a pattern of
applied in a grid.

FIG. 10 is a schematic illustration of an assembly.

DETAILED DESCRIPTION OF THE INVENTION

Figure 1:
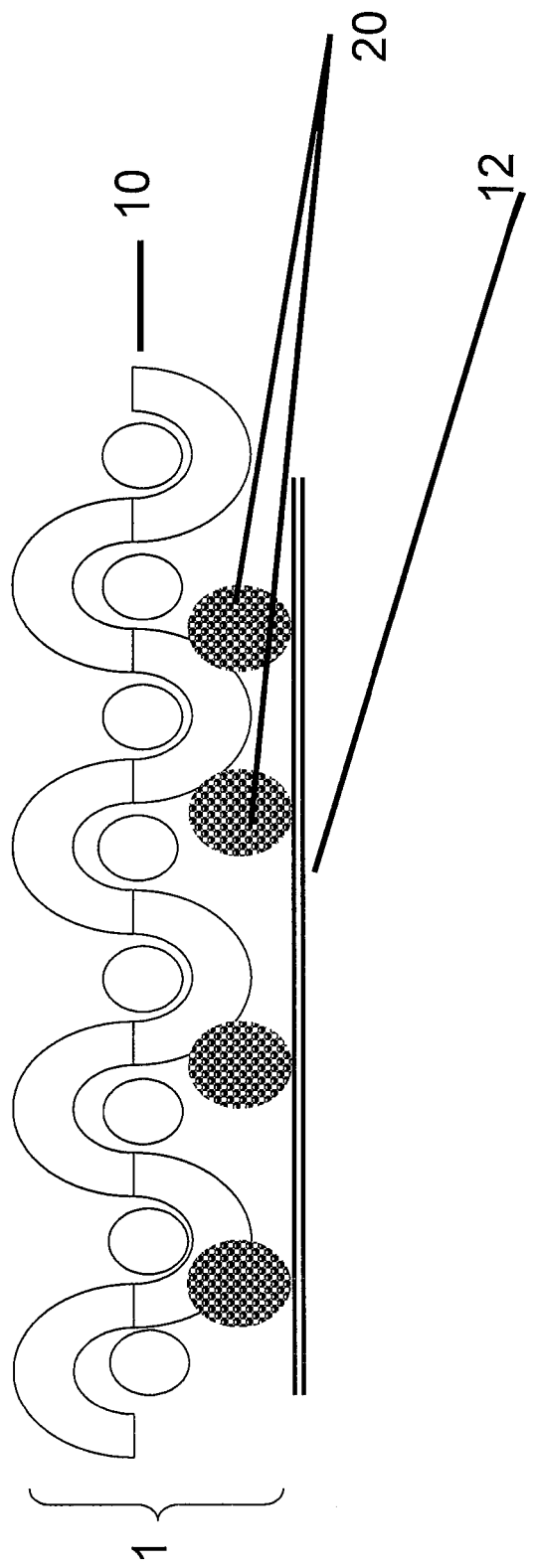
FIG. 1 is a schematic illustration of a cross-sectional view of one embodiment described herein.

Thermal Protective Performance (TPP) is related to the time to record second degree burn, and materials having higher TPP values are considered to offer better burn protection. In one embodiment, a method is described for improving the thermal performance protection (TPP) of a thermally stable textile and thereby forming a thermally protective material. In another embodiment, a polymer resin-expandable graphite mixture is described which improves the heat and/or flame protective properties of substrates onto which it is disposed. In one method, a thermally protective material is formed by providing a flame resistant, thermally stable textile and forming an active insulation on one side of it. With reference to FIG. 1, an exemplary embodiment of a thermally protective material (1) is illustrated, comprising a thermally stable textile (10) comprised of flame resistant textile and an active insulation (20) comprised of a polymer resin-expandable graphite mixture which is applied to one side of the thermally stable textile discontinuously in the form of discrete dots. In one embodiment, a thermally protective material (1) comprising a flame resistant thermally stable textile (10) and an active insulation (20) formed thereon has a TPP of at least 2 cal/cm$^2$ greater than the TPP of the flame resistant thermally stable textile (10) without an active insulation, when tested according to the method described herein. In the test method described herein, materials are oriented in the test fixture so that the active insulation is positioned opposite the side of the thermally stable textile (10) that is closest to the heat source. An additional layer of material (12) such as a waterproof breathable film, such as breathable polyurethane additionally may be provided to the material on the side adjacent the active insulation, so that the active insulation is between the additional layer and the thermally stable textile layer.

In another embodiment, a method is provided for increasing the TPP of a thermally stable substrate, such as a thermally stable textile, comprising providing an active insulation by applying up to about 140 gsm of polymer resin-expandable graphite mixture to the thermally stable substrate, and increasing the TPP by at least about 0.5 cal/cm$^2$ per approximately 35 gsm of polymer resin-expandable graphite mixture applied to the thermally stable textile. Preferably, the TPP is increased by at least about 1.0 cal/cm$^2$ per approximately 35 gsm of mixture applied to the substrate, up to about 140 gsm of mixture disposed on the substrate. In some embodiments described herein, a thermally protective material can be formed whereby the TPP of a textile is increased by at least 1 cal/cm$^2$, or at least 2 cal/cm$^2$, or at least 3 cal/cm$^2$, or at least 4 cal/cm$^2$, or at least 5 cal/cm$^2$, or greater by providing an active insulation when compared to the same material to which active insulation has not been provided. Advantageously, the TPP of thermally stable textiles and thermally stable textile composites are increased by the methods disclosed herein without significantly increasing the weight, insulation at room ambient temperature, or decreasing breathability. In some embodiments the polymer resin-expandable graphite mixture is applied to the thermally stable textile in an about of less than about 100 gsm, or less than about 75 gsm, or less than about 50 gsm, or less than about 25 gsm.

Figure 2:
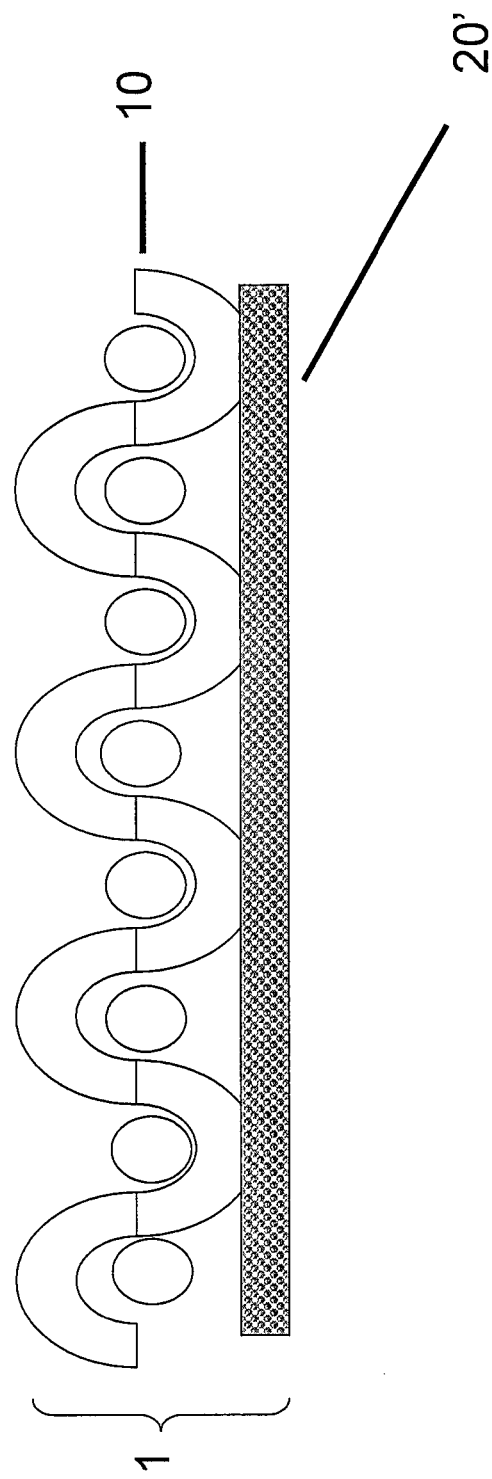
FIG. 2 is a schematic illustration of cross-sectional view of another embodiment described herein.

In an alternate embodiment, with reference to FIG. 2, a method is provided for increasing the TPP of a flame resistant, (20') thermally stable textile (10), comprising forming an active insulation (20') by applying a continuous coating of a polymer resin-expandable graphite mixture to a surface of a thermally stable textile (10) comprising a flame resistant textile. Where the polymer resin-expandable graphite mixture is applied continuously, it may be preferred that the polymer resin is breathable where, for example, wearer comfort is desired.

Figure 3:
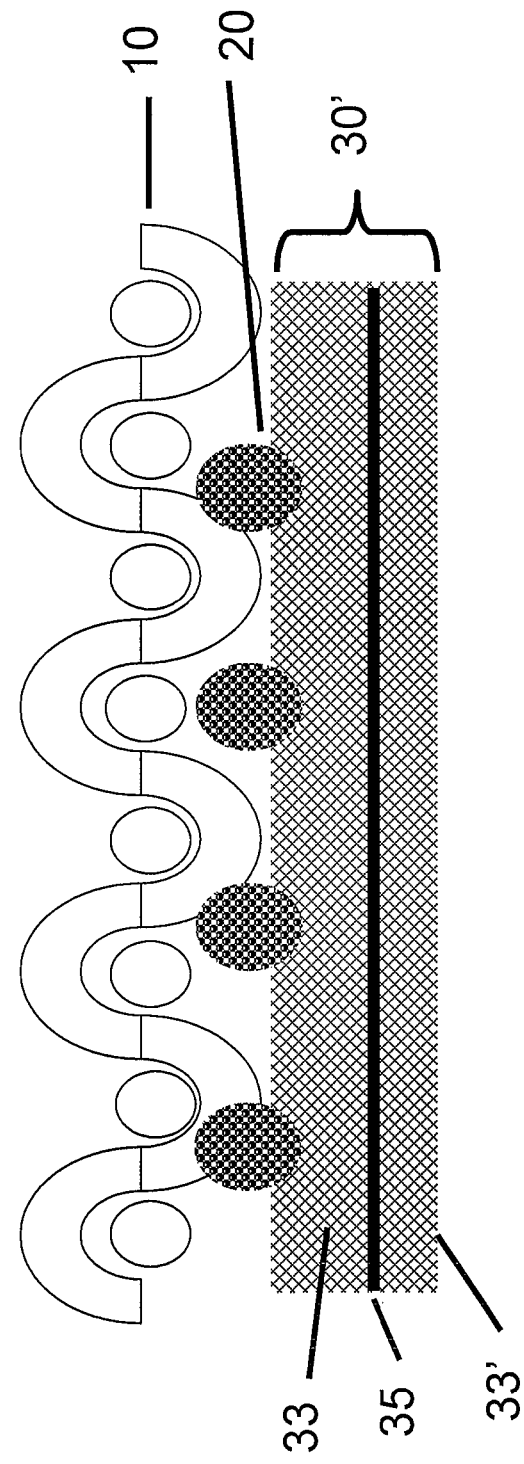
FIG. 3 is a schematic illustrating one embodiment described herein.
Figure 4:
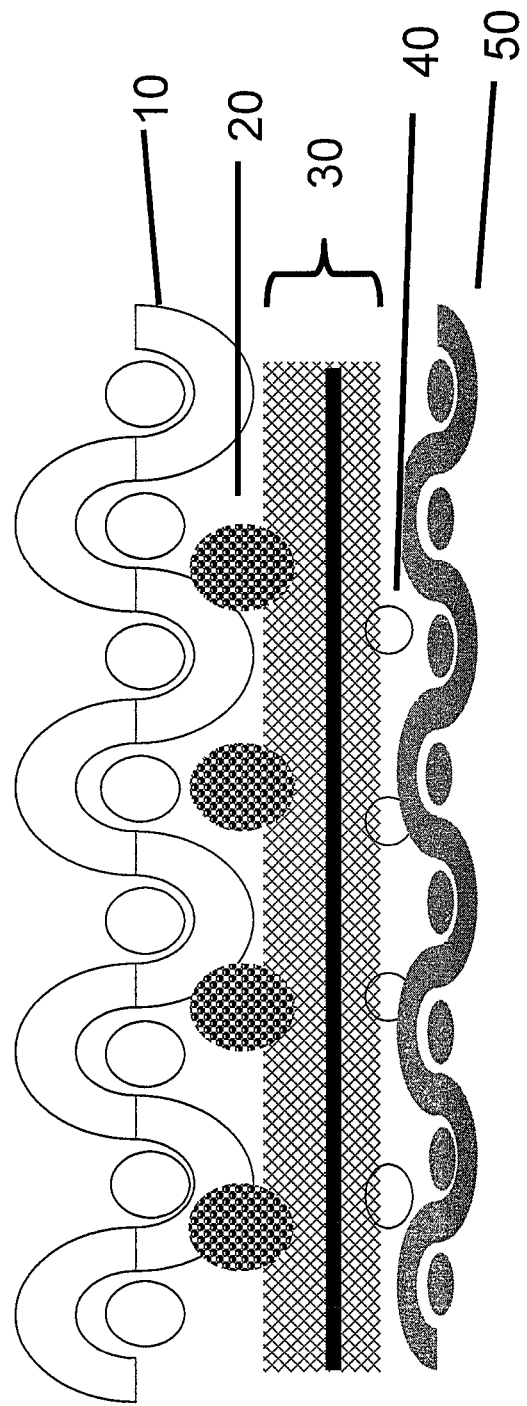
FIG. 4 is a schematic illustration of a cross-sectional view of another embodiment described herein.
Figure 5:
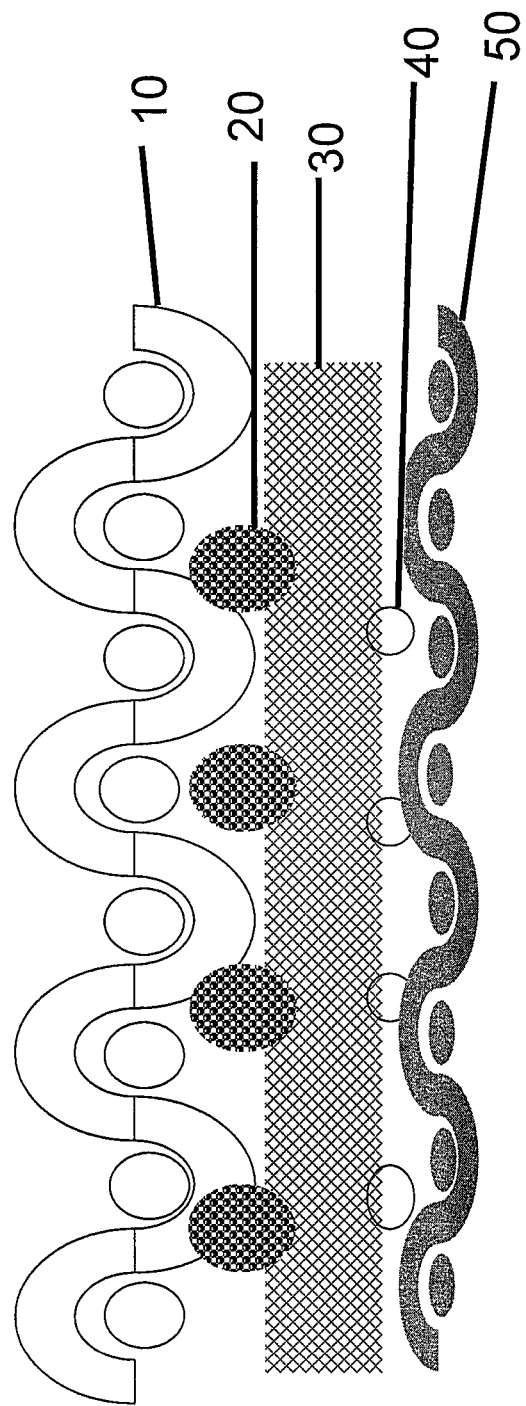
FIG. 5 is a schematic illustration of a cross-sectional view of another embodiment described herein.

Another method is provided for increasing the TPP of a flame resistant laminate by at least 3 cal/cm$^2$. By way of example with reference to FIGS. 3 and 5, a flame resistant laminate of a thermally stable textile (10) comprising a flame resistant textile and a convective barrier (30') is provided with an active insulation (20) between the thermally stable textile (10) and the convective barrier (30'), forming a thermally protective laminate. Convective barrier (30) comprises at least one barrier layer (30 in FIG. 5) and optionally, multiple barrier layers (33, 33') may be used to form the convective barrier (30' in FIG. 3). The convective barrier (30') may further comprise an additional layer, such as a monolithic polymer layer (35) which may enhance desired properties of the convective barrier. In one method, active insulation (20) is formed by applying a polymer resin-expandable graphite mixture to one surface of the convective barrier (30 or 30') or, in an alternate embodiment, the active insulation (20) is provided to one surface of the thermally stable textile (10), prior to lamination. In a further method step, as illustrated in FIGS. 3 and 5, the thermally stable textile (10) and the convective barrier (30) are joined by the active insulation (20) bonding the two layers together. By providing an active insulation (20) between the thermally stable textile (10) and the convective barrier (30), a thermally protective laminate is formed having an increase in TPP of at least 3 cal/cm$^2$ compared to a laminate substantially of the same construction without an active insulation. In a further optional embodiment, as exemplified in FIGS. 4 and 5, a textile backer (50) may be applied to the laminate by attachments such as adhesive dots (40).

Figure 8:
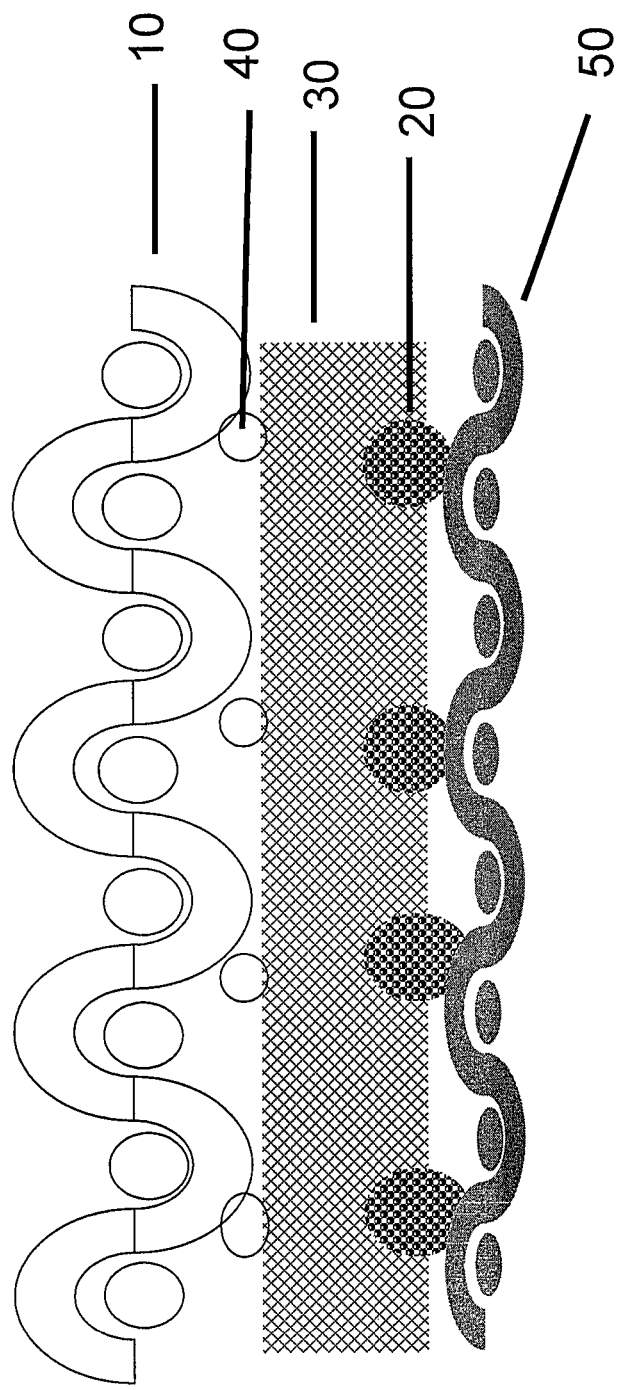
FIG. 8 is a schematic illustration of a cross-sectional view of another embodiment described herein.

In an alternate embodiment as depicted by a schematic of the material cross-section illustrated in FIG. 8, a method comprises providing a thermally stable textile (10), bonding a convective barrier (30) to one side by adhesive bonds (40), and applying an active insulation (20) to the convective barrier (30) on a side opposite the thermally stable textile. Optionally, a backer textile (50) may be bonded to the convective barrier (30) with the active insulation therebetween; or the backer textile (50) be bonded to the convective barrier (30) by the active insulation (20). The TPP of the laminate comprising the active insulation is greater than the TPP of a laminate of substantially the same materials without the active insulation.

Figure 6:
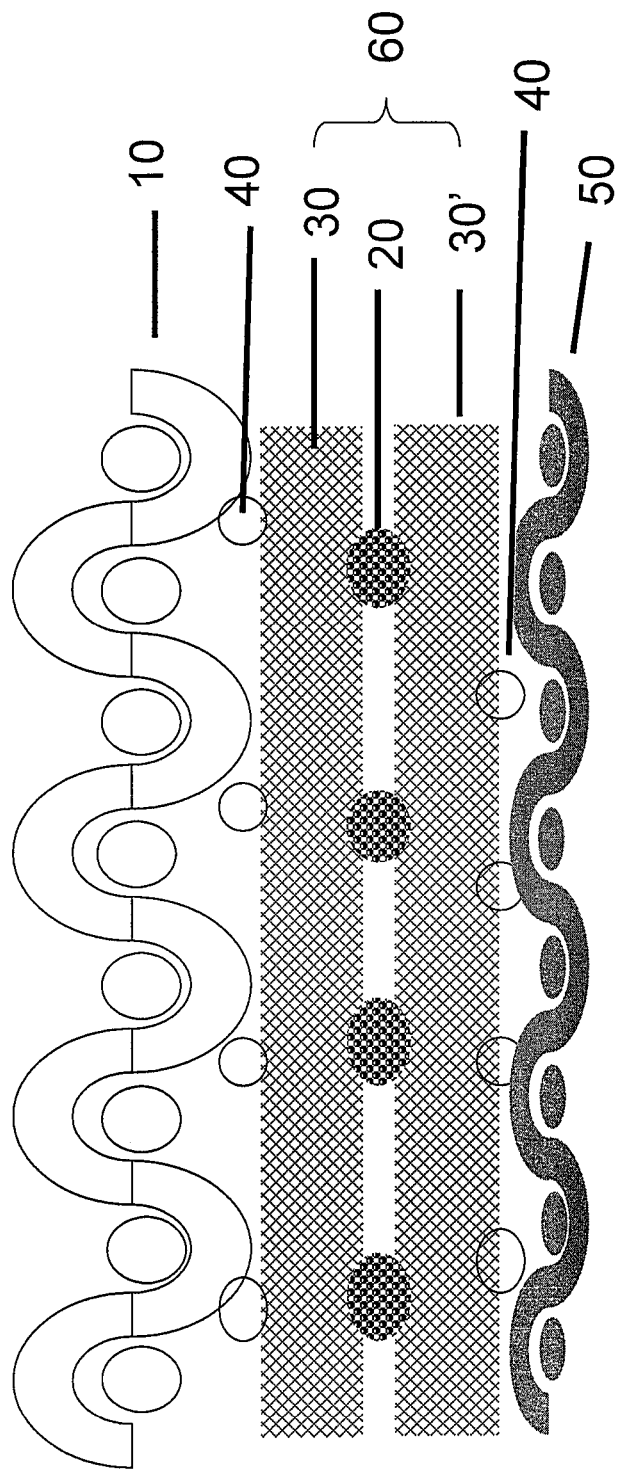
FIG. 6 is a schematic illustration of a cross-sectional view of another embodiment described herein.
Figure 7:
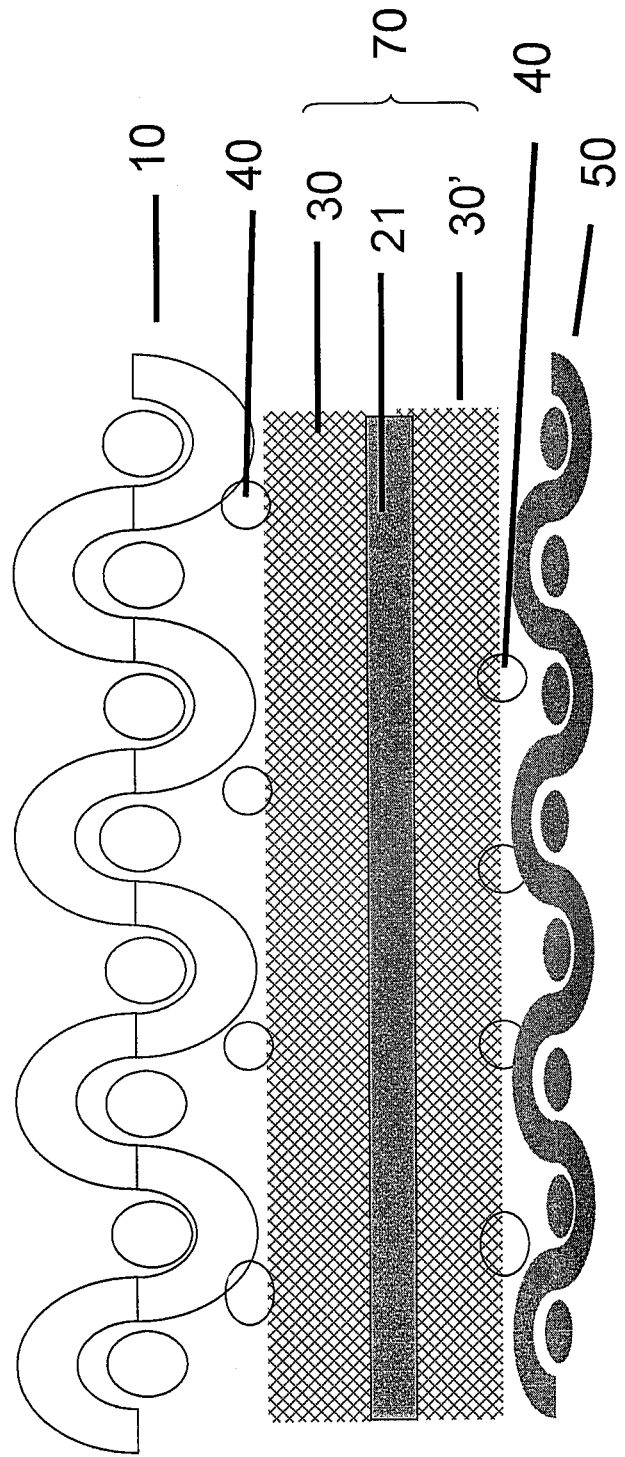
FIG. 7 is a schematic illustration of a cross-sectional view of another embodiment described herein.

In a further embodiment as exemplified by the cross-sectional representation of a thermal protective material illustrated in FIGS. 6 and 7, a method is provided for improving the thermal performance of a laminate comprising providing a flame resistant laminate comprising a thermally stable textile (10) and a convective barrier (30); and forming an active insulation-convective barrier composite (60 or 70). In one embodiment, a method for forming the active insulation-convective barrier composite (60 or 70) comprises applying an active insulation (20 or 21) which comprises a polymer resin-expandable graphite mixture to a first convective barrier (30), and joining a second convective barrier (30') by bonding it to the first convective barrier, for example by bonding with the active insulation. In this construction, advantageously a higher TPP is achieved by forming an active insulation-convective barrier composite, while maintaining low CLO values for low thermal insulation material as shown in Table 1. Optionally, an additional layer such as a backer textile (50) may be provided for properties such as abrasion resistance or further enhanced thermal performance. For example, in some embodiments a thermally stable textile backer may be added. Examples of suitable thermally stable textile backers include aramids, FR cottons, PBI, PBO, FR rayon, modacrylic blends, polyamines, carbon, fiberglass, PAN, PTFE, and blends and combinations thereof. The thermally stable textile (10) and the backer textile (50) may be joined to the active insulation-convective barrier composite (60 or 70) by, for example adhesive attachment (40).

In some embodiments as illustrated in FIGS. 2 and 7, the active insulation comprising a polymer resin-expandable graphite mixture may be applied as a continuous layer and thereby covering substantially 100% of the surface to which it is applied. However, as depicted, for example, in FIGS. 3 and 4 where enhanced breathability is desired, the active insulation (20) may be applied discontinuously wherein less than 100% surface coverage is achieved. Where the active insulation comprising the polymer resin-expandable graphite mixture is applied discontinuously, the mixture may be applied to achieve a surface coverage of less that 50%, or less than 40% or less than 35%, or less than 30%. In some embodiments, the active insulation material may be applied as discrete dots having a spacing of about 2000 μm or greater, or a spacing of about 2000 μm to about 5000 μm or a spacing of about 2000 μm to about 10000 μm. FIG. 9 shows two discontinuous patterns that are suitable for the present invention, dots of active insulation (90) (FIG. 9a) and a grid pattern of active insulation (91) (FIG. 9b) applied to, for example, a textile (10), each having less then 50% surface coverage. The term dots is intended to include any discrete shape or form in which the mixture may be deposited such as circles, ovals, diamonds, ellipses, rectangles, and the like. The active insulation is formed by applying the polymer resin-expandable graphite mixture in a manner which provides a durable bond of the mixture to either the outer textile, the convective barrier or both. The application technique is selected so that the expandable graphite particles are substantially disposed on one side of the thermally stable textile, and not uniformly dispersed throughout the thermally stable textile cross-section.

In one embodiment, the active insulation comprising the polymer resin-expandable graphite mixture forms an expanded structure which remains bonded to a substrate after expansion. The active insulation preferably has a thickness increase of at least 200%, or at least 250% after 90 seconds of heat exposure in a convective oven heated to 300° C., and structural integrity in the post-expanded state. By structural integrity it is meant that the active insulation, after expansion, remains substantially bonded to the substrate without substantially disintegrating and/or flaking off the substrate upon flexing or bending the substrate. Preferably, the active insulation, after expansion, maintains integrity and withstands compression without substantially disintegrating or flaking off the substrate, when tested for thickness according to the thickness change test described herein.

In some embodiments, a thermally stable textile further comprises an active insulation comprising the polymer resin-expandable graphite mixture which expands to a thickness increase of at least about 150 μm, or an increase of at least about 500 μm, or an increase of at least about 750 μm, or an increase of at least about 1000 μm, or an increase of least about 1500 μm, after 90 seconds of heat exposure in a convective oven heated to about 300° C.

Expandable graphite flakes or particles suitable for use in the polymer resin-expandable graphite mixture have an expansion of at least 2000 μm, or more preferably an expansion of at least 3000 μm when heated to 340° C., tested according to the Expansion Test described herein. Preferred graphite particles will have an average mesh size, based on US standard mesh sizes, of between 25 and 230, which corresponds approximately to sieve openings of 0.699 mm and 0.066 mm respectively. More preferable the graphite particles will have an average mesh size of between 50 and 150, which corresponds approximately to sieve openings of 0.297 mm and 0.104 mm respectively.

In some embodiments, polymer resins for use in the polymer resin-expandable graphite mixture are selected which have a melt or softening temperature of less than 340° C. Polymer resins that are sufficiently flowable or deformable to allow the expandable graphite to expand substantially upon heat exposure at or below 340° C. are particularly useful in some embodiments. Polymer resins having an extensional viscosity low enough to allow for expansion of the expandable graphite and high enough to maintain the structural integrity of the expanded structure are also useful in some embodiments. Polymer resin may be selected which have a storage modulus between about $10^3$ and about $10^8$ dyne/cm$^2$ and Tan delta between about 0.1 and about 10 at 200° C. to form textile and textile composites having desired properties. Polymer resins may be selected which have a storage modulus of less than about $10^6$ dyne/cm$^2$ at 200° C. or less than about $10^4$ dyne/cm$^2$ at 200° C. Polymer resins suitable for use in some embodiments include some elastomeric polymers. Other polymer resins suitable for use in some embodiments are cross-linkable, including cross-linkable polyurethane such as Mor-melt R7001 E (from Rohm & Haas.) In other embodiments, suitable polymer resins include some thermoplastic polymers having a melt temperature between about 50° C. and about 250° C., such as Desmomelt VP KA 8702 (from Bayer Material Science). Additionally, polymer resins suitable for use in embodiments described herein comprise polymers which include but are not limited to polyesters, thermoplastic polyurethanes and crosslinkable polyurethanes, and combinations thereof. Other polymer resins which may be suitable for use in certain embodiments comprises one or more polymers selected from polyester, polyamide, acrylic, vinyl polymer, polyolefin. Other polymer resins which may be suitable in certain applications comprise silicone or epoxy.

In some embodiments, the polymer resin-expandable graphite mixture, upon expansion, form a plurality of tendrils comprising expanded graphite. The total surface area of the polymer resin-expandable graphite mixture increases significantly when compared to the same mixture prior to expansion. In one embodiment, the surface area increase of the mixture is at least ten times greater than the surface area of the mixture prior to expansion. In another embodiment, the surface area increase is at least twenty times the surface area of the mixture prior to expansion. In addition, tendrils formed upon expansion of the mixture may extend outward from the core of the expanded mixture. In an embodiment where the polymer resin-expandable graphite mixture is disposed on a substrate in a discontinuous form, tendrils extend to at least partially fill the open areas between the discontinuous domains. In a further embodiment, the tendrils will be elongated, having a length to width aspect ratio of at least 5 to 1.

A method for making an active insulation material comprising a polymer resin-expandable graphite mixture is provided comprising rendering a polymer resin flowable or deformable at a temperature below the expansion onset temperature of the expandable graphite, and mixing expandable graphite into the flowable polymer resin to form the mixture. In other methods, expandable graphite may be added to a monomer or prepolymer for use as the polymer resin, prior to polymerization. In another embodiment, a method comprises dissolving a polymer resin and mixing an expandable graphite with the polymer, and drying the mixture. Between about 1 wt % and about 50 wt % of expandable graphite based on the total mixture weight may be added to the polymer resin. In other embodiments, between about 1 wt % and about 30 wt % of expandable graphite, or less than about 30 wt %, or less than about 20 wt %, or less than about 10 wt %, or less than about 5 wt % expandable graphite, based on the total mixture weight, is added to the polymer resin. In some embodiments it is desired that the expandable graphite particles are substantially contained within and/or encapsulated by the polymer resin in the polymer resin-expandable graphite mixture. Other additives such as pigments, fillers, antimicrobials, processing aids and stabilizers may also be added to the mixture. In one method, the resulting active insulation comprising a polymer resin-expandable graphite mixture may be applied by first heating the mixture to a temperature below the expansion initiation temperature of the graphite to soften the mixture.

Thermally stable textiles suitable for use in the present invention may be a woven, knit, or non-woven textile comprising flame resistant textiles. Thermally stable textiles comprising flame resistant textiles may comprise meta-aramid, para-aramid or blends thereof. Thermally stable textiles may further comprise PBI, PBO, modacrylic, FR cotton, FR rayon, and blends thereof.

A convective barrier may prevent or reduce the convective heat transfer to the layers behind it when exposed to a convective heat source. Convective barriers for use in embodiments described herein have a maximum air permeability of less than about 10 Frazier after thermal exposure. More preferably, a convective barrier has an air permeability after thermal exposure of less than 5 Frazier. Thermally stable materials suitable for use in the convective barrier comprise materials such as a heat stable film and include materials such as polyimide, silicone, and polytetratfluoroethylene (PTFE), for example dense PTFE or expanded PTFE (ePTFE). The convective barrier may comprise a single layer or multiple layers. In FIGS. 6 and 7, the convective barrier comprises multiple polymeric layers (30 and 30'). In the embodiment of FIG. 6, convective barrier (30) may be comprised of two thermally stable films (30 and 30') having active insulation material (20) disposed therebetween. In one embodiment, the active insulation material is applied to bond multiple layers of the convective barrier.

Thermally protective materials and laminates may be made according to the methods described herein that have an MVTR greater than about 1000 g/m$^2$/day, greater than about 2000 g/m$^2$/day, greater than about 3000 g/m$^2$/day, greater than about 5000 g/m$^2$/day, greater than about 7000 g/m$^2$/day, greater than about 9000 g/m$^2$/day, greater than about 10000 g/m$^2$/day, or higher, while achieving a TPP increase of greater than 1 cal/cm², or greater than 2 cal/cm², or greater than 3 cal/cm², or greater than 4 cal/cm², or greater than 5 cal/cm², or greater than 6 cal/cm², or higher, when tested according to the methods described herein and compared to materials constructed with substantially the same materials without active insulation, or without active insulation between the outer textile and the convective barrier.

Thermally protective materials made according to the methods described herein preferably have low thermal resistance, for example, to enhance user comfort while working in high heat environments. When incorporated into garments, materials having low thermal resistance reduces the heat stress of the wearer. Low thermal resistance can be represented by the CLO value as measured by the test method described herein. High CLO values indicate high thermal resistance. Thermally protective materials made according to methods described herein may have a CLO of less than about 0.45, or less than about 0.40, or less than about 0.30, or less than about 0.20, or less than about 0.15, or less than about 0.14, or less than about 0.13, or less than about 0.12, while achieving an increase in TPP of greater than or equal to about 1 cal/cm², or greater than or equal to about 2 cal/cm², or greater than or equal to about 3 cal/cm², or greater than or equal to about 4 cal/cm² or greater than or equal to about 5 cal/cm² or greater than or equal to about 6 cal/cm² compared to materials constructed substantially the same without active insulation, when made and tested according to the methods described herein.

Thermally protective textile and textile composites made according to the methods may be useful in garments, tents, boots, gloves and other applications in which thermal performance protection is desired. Thermally protective materials described herein may also be found to be suitable for the protection of objects or devices from heat.

Without intending to limit the scope of the present invention, the following examples illustrate how the present invention may be made and used.

Test Methods

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m²/24 hrs. as tested by the method described in U.S. Pat. No. 4,862,730 (to Crosby), was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

Weight

Weight measurements on materials were conducted as specified in ASTM D751, section 10.

Frazier/Thermally Stable Convective Barrier

To determine the thermal stability of a convective barrier, a 381 mm (15 in.) square material sample was clamped in a metal frame and then suspended in a forced air-circulating oven at 260° C. (500° F.). Following a 5-minute exposure, the specimen was removed from the oven. After allowing the specimen to cool down, the air permeability of the specimen was tested according to test methods entitled ASTM D 737-75. "Standard Test Method for. AIR PERMEABILITY OF TEXTILE FABRICS." Specimens with less than 5 Frazier were considered as a thermally stable convective barrier.

Vertical Flame Test

Textile material samples were tested in accordance with ASTM D6413 test standard. Samples were exposed to flame for 12-seconds. After-flame time was averaged for 3 samples. Textiles with after-flame of greater than 2 seconds were considered as flammable; textiles with an after-flame of less than or equal to about 2 seconds were considered flame resistant.

Melting and Thermal Stability Test

This test was used to determine the thermal stability of textile materials. The test is based on thermal stability test as described in section 8.3 of NFPA 1975, 2004 Edition. The test oven was a hot air circulating oven as specified in ISO 17493. The test was conducted according to ASTM D 751, *Standard Test Methods for Coated Fabrics*, using the Procedures for Blocking Resistance at Elevated Temperatures (Sections 89 to 93), with the following modifications:

Borosilicate glass plates measuring 100 mm×100 mm×3 mm (4 in.×4 in.×⅛ in.) were used.

A test temperature of 265° C., +3/−0° C. (510° F., +5/−0° F.) was used.

The specimens were allowed to cool a minimum of 1 hour after removal of the glass plates from the oven.

Any sample side sticking to glass plate, sticking to itself when unfolded or showing evidence of melting or dripping was considered as meltable. Any sample side lacking evidence of meltable side was considered as thermally stable.

Expansion Test

TMA (Thermo-mechanical analysis) was used to measure the expansion of expandable, graphite particles. Expansion was tested with TA Instruments TMA 2940 instrument. A ceramic (alumina) TGA pan, measuring roughly 8 mm in diameter and 12 mm in height was used for holding the sample. Using the macroexpansion probe, with a diameter of roughly 6 mm, the bottom of the pan was set the zero. Then flakes of expandable graphite about 0.1-0.3 mm deep, as measured by the TMA probe, were put in the pan. The furnace was closed and initial sample height was measured. The furnace was heated from about 25° C. to 600° C. at a ramp rate of 10° C./min. The TMA probe displacement was plotted against temperature; the displacement was used as a measure of expansion.

Thickness Change Test

This test method was used for testing thickness change of Polymer resin expandable graphite mixture by itself as well as when applied to a thermally stable substrate. To test the thickness change on mixture only, the mixture was cast into a PTFE mould to get tablets of approximately ½" diameter and ⅛" thickness and removed from the mould after the mixture was substantially cured. Samples were tested for initial thickness as per ASTM D751, section 9 with the exception that the pressure foot diameter was 1". The instrument was adjusted to apply a pressure force of approximately 3.4 psi to the specimen. A convection type oven was set at 300 C and after the temperature had reached steady state, sample was introduced in the oven and exposed to 300 C for 90 seconds. After 90-seconds, the sample was removed from the oven, held in vertical orientation to observe for any coating flake-off and then allowed to cool for 5 minutes. The sample was remeasured for thickness after oven exposure. Thickness change and integrity of the expanded structure were noted after the test.

CLO

This test is used to measure the rate of heat which can flow through a product from which its resistance to this flow can be calculated. The test specimen was inserted between two plates. Bottom plate was kept at a constant temperature of 35° C. meant to represent the skin temperature. The top plate had a heat flow sensor embedded in the center of the plate which measured the heat loss which was reported as a heat transfer coefficient hc, $(W/m^2/K)$ and reciprocal was reported as its thermal insulation, Rct $(m^2K/W)$. CLO was calculated by the following equation:

$$CLO = 0.155 \times Rct.$$

TPP Test Method

Multiple test specimens (6×6 in.) of the materials were prepared for testing. Thermal resistance was measured using the CSI Thermal Protective Performance (TPP) Tester according to NFPA 1971 Standard on Protective Ensemble for Structural Fire Fighting; Section 6-10 of the 2000 edition.

Individual materials were tested with a ¼" spacer. Also, ensembles or assemblies with multiple materials lay-up were tested in contact configuration as specified by the test method.

EXAMPLES

Convective Barrier 1

A convective barrier was made substantially according to commonly owned U.S. Pat. No. 5,418,054A.

Polymer Resin (PR) 1

A flame retardant polyurethane resin was prepared by first forming a resin in accordance with U.S. Pat. No. 4,532,316, and adding in the reactor a phosphorus-based additive (Antiblaze PR82) in an amount of about 20% by weight of the total polymer resin.

Polymer Resin-Expandable Graphite Mixture 1

A mixture of a polymer resin having a flame retardant and expandable graphite was prepared as follows. A mixture of an expandable graphite and polymer resin was prepared by mixing about 20 g of expandable graphite (Grade 3626 from Asbury Graphite Mills, Inc) with about 80 g of PR 1. Mixing of expandable graphite flakes into the resin was carried out at about 100° C., using a low shear hand mixer for at least 1 minute to ensure uniform dispersion forming polymer resin-expandable graphite mixture 1.

Polymer Resin-Expandable Graphite Mixture 2

A mixture comprising a polymer resin and expandable graphite was prepared. A polymer resin was prepared in accordance with commonly owned U.S. Pat. No. 4,532,316. About 20 g expandable graphite (Grade 3626 from Asbury Graphite Mills, Inc) was added to 80 g of resin to form polymer resin-expandable graphite mixture 2. Mixing was accomplished substantially according to the mixing step described in Polymer resin-expandable graphite mixture 1.

Example 1

A textile comprising active insulation was prepared as follows. Defender™, a Nomex® based woven fabric weighing 7.5 oz/yd2 available from Southern Mills, Inc was coated with discrete dots of the polymer resin-expandable graphite mixture 2 by a gravure roller (at about 100° C. with a pressure of about 40 psi) in such a manner as to provide coverage of approximately 32 percent on the surface of the fabric, with a laydown of about 35 grams per square meter (gsm). The gravure roll had a round dot pattern with a cell depth 1200 um, cell opening of 2500 um, and a spacing of 2500 um.

The coated fabric was allowed to cure at 50% RH and 23° C. for 48 hours.

Samples of the textile coated with the polymer resin-expandable graphite mixture 2 were tested for thickness change according to the method described herein. After oven exposure the polymer resin-expandable graphite mixture increased in thickness by 1500 μm and did not flake off the substrate.

Samples of the textile coated with the polymer resin-graphite mixture 2 were also tested for TPP according to the method described herein for individual materials wherein the coated side was facing away from the TPP heat source, and compared with the control of the same fabric without a coating. The samples prepared according to this example had an average TPP of about 21.1 cal/cm2. The control had a TPP of about 16.2 cal/cm2.

Samples of the textile coated with the polymer resin-expandable graphite mixture 2 were tested as an ensemble in a multilayer lay-up according to the method described herein. A sample of Example 1 was provided as the outer shell having the coated side facing away from the TPP heat source. Crosstech™ 2C (from W.L. Gore & Associates, Inc.) was used as the moisture barrier and Q-9™ fabric (from Southern Mills, Inc.) was used as the thermal barrier. The ensemble had an average TPP of about 59.3 cal/cm2. A control ensemble of the same construction except wherein Defender Nomex fabric without the polymer resin-expandable graphite mixture 2 was used as the outer shell. The control ensemble had an average TPP of 43.8 cal/cm2.

Example 2

A laminate comprising a Nomex face fabric, a convective barrier and having active insulation therebetween was prepared as follows.

A laminate was made using a 3.3 oz/yd2 Nomex IIIA plain weave face fabric, and Convective Barrier 1. The laminate was constructed by printing discrete dots of polymer resin-expandable graphite mixture 1 onto the Convective Barrier 1 in a manner according to Fabric Example 1. The convective barrier was then adhered to the 3.3 oz/yd² Nomex IIIA woven using a nip at a pressure of about 30 psi. The resultant laminate was a two layer laminate comprising the convective barrier and the Nomex IIIA woven flame resistant face textile layer, and active insulation therebetween. The laminate was then taken up onto a steel drum under tension and allowed to cure for about 48 hours at greater than about 50% relative humidity.

Samples of material were evaluated for flammability, CLO and MVTR according to the methods described herein. The samples tested as per vertical flame test has less than 2 seconds after-flame. The TPP of the samples was evaluated by orienting the material so that the Nomex face textile side was exposed to the heat source. Results are shown in Table 1 for individual sample testing.

Samples of the laminate according to Example 2 were also tested as an ensemble as illustrated in FIG. 10 (100) in a multilayer lay-up according to the method described herein. A sample of the laminate Example 2 was provided as the moisture barrier layer (102) having the Nomex face textile side facing towards Defender™ (from Southern Mills, Inc) as shell layer (103) and Aralite™ fabric (from Southern Mills, Inc.) was used as the thermal liner (101) facing the TPP sensor (104). The ensemble had an average TPP of about 46.4 cal/cm2.

Example 3

A laminate was prepared comprising a Nomex face textile, a convective barrier and active insulation therebetween, and further comprising a aramid backer textile.

The two layer laminate from Example 2 was further processed by applying PR1 in a discrete dot pattern to the exposed convective barrier face (on the side opposite the Nomex IIIA woven face textile). A 1.7 oz/yd2 aramid backer woven textile layer was then adhered to the two layer laminate by feeding the adhesive printed two layer laminate and the aramid backer through an additional nip. The prepared three layer laminate was then taken up onto a steel drum under tension and allowed to cure for about 48 hours at greater than about 50% relative humidity.

Samples of the material were evaluated for CLO and MVTR according to the methods described herein. TPP of the samples was evaluated by orienting the material so that the Nomex face textile side was exposed to the heat source. Results are shown in Table 1.

Samples of the laminate made according to Example 3 were also tested as an ensemble in a multilayer lay-up according to the method described herein. A sample of the laminate of Example 3 was provided as the moisture barrier layer having the 3.3 oz/dy2 Nomex face fabric side facing towards Defender™ (from Southern Mills, Inc) as shell layer and Aralite™ fabric (from Southern Mills, Inc.) was used as the thermal liner facing the TPP sensor. The ensemble had an average TPP of about 50.5 cal/cm2.

Example 4

A laminate was prepared comprising a Nomex face textile, a polyurethane film, and active insulation therebetween, and further comprising a aramid backer textile.

A three layer laminate was constructed substantially according to the laminate of Example 3, except that a breathable monolithic thermoplastic polyurethane film sold by Omni flex (Greenfield, Mass.) under part number 1540 was used in place of the Convective Barrier 1 to construct the two layer laminate.

Samples of material were evaluated for TPP according to the methods described herein. The samples were tested for TPP by orienting the material so that the Nomex face fabric side was exposed to the heat source. Results are shown in Table 1.

Example 5

A laminate was prepared comprising a Crosstech™ 2c, a convective barrier and active insulation therebetween.

A three layer laminate was prepared by printing discrete dots of Polymer resin-expandable graphite mixture 1 on Convective Barrier 1 and then adhering to the film side of Crosstech™ 2c (available from W.L. Gore & Associates, Inc.) using a nip. The discrete dots were printed by a gravure roller in such a manner as to provide surface coverage of approximately 32 percent on Convective Barrier 1. The resultant laminate was a three layer laminate with polymer resin-expandable graphite mixture applied in a discrete pattern between two convective barriers.

Samples of material were evaluated for CLO and TPP according to the methods described herein. The samples were tested for TPP by orienting the material so that the Nomex fabric side was exposed to the heat source. Results are shown in Table 1.

Comparative Example 1

A composite was prepared by laminating a Nomex fabric and a Convective Barrier without an active insulation therebetween. A composite comprising an expanded PTFE convective barrier and a 3.3 ounce per square yard Nomex fabric, sold as Crosstech™ 2c available from W.L. Gore & Associates, Inc. (Elkton, Md.) was prepared.

Samples of material were evaluated for CLO and TPP according to the methods described herein. The samples were tested for TPP by orienting the material so that the Nomex face fabric side was exposed to the heat source. Results are shown in Table 1.

Samples of the laminate made by Comparative example 1 were also tested as an ensemble in a multilayer lay-up according to the method described herein. A sample of the Comparative example 1 was provided as the moisture barrier layer having the 3.3 oz/dy2 Nomex face fabric side facing towards Defender™ (from Southern Mills, Inc) as shell layer and Aralite™ fabric (from Southern Mills, Inc.) was used as the thermal liner facing the TPP sensor. The ensemble had an average TPP of about 40.8 cal/cm2.

Comparative Example 2

A laminate was prepared comprising Crosstech™ 2c, and aramid backer, without active insulation.

A three layer laminate was made by laminating a sample comprising Crosstech 2c and 1.7 oz/yd2 aramid backer fabric available from W.L. Gore & Associates, Inc.

Samples of material were evaluated for CLO and TPP according to the methods described herein. The samples were tested for TPP by orienting the material so that the Nomex face fabric side was exposed to the heat source. Results are shown in Table 1.

Example 6

A laminate was prepared comprising Crosstech 2c, an aramid backer textile and active insulation therebetween.

A three layer laminate was constructed by applying Polymer resin-expandable graphite mixture 1 in a discrete dot pattern to the exposed ePTFE side of Crosstech™ 2c material and adhering a 1.7 oz/yd² aramid backer woven textile layer to the ePTFE side by feeding the two layer laminate and the aramid backer through an additional nip. The prepared three layer laminate was then taken up onto a steel drum under tension and allowed to cure for about 48 hours at greater than about 50% relative humidity.

Samples of the material were tested for CLO and Thermal Protection Performance according to the methods described herein. The material was oriented so that the Nomex face fabric side of the Crosstech™ 2c material was exposed to the heat source. Results are provided in Table 1.

TABLE 1

| Example | CLO m²K/W | TPP cal/cm² | MVTR g/m²/day |
| --- | --- | --- | --- |
| Example 2 | 0.12 | 17.8 | >9700 |
| Comparative Example 1 | 0.11 | 12.6 | >13500 |
| Example 3 | 0.13 | 22.8 | >5000 |
| Comparative Example 2 | 0.12 | 17.5 | >5900 |
| Example 4 | n/a | 17.2 | n/a |
| Example 5 | 0.12 | 24.2 | >2400 |
| Example 6 | 0.14 | 19.2 | n/a | n/a - data not available

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method for increasing the thermal protective performance (TPP) of a thermally protective laminate compared to the laminate without an active insulation, said method comprising:
    forming an active insulation on a first convective barrier by applying a polymer resin-expandable graphite mixture discontinuously to a surface of the first convective barrier in an amount of less than about 140 gsm,
    positioning a flame resistant, thermally stable textile on said first convective barrier on a side opposing said polymer resin-expandable graphite mixture to form a thermally protective laminate, and
    positioning a second convective barrier on said polymer resin-expandable graphite mixture opposing said first convective barrier such that said polymer resin-expandable graphite mixture is sandwiched between said first and second convective barriers, wherein the thermal protective performance is increased by at least 2.0 cal/cm² per approximately 35 gsm of said polymer resin-expandable graphite mixture.

2. The method of claim 1, wherein said thermally protective laminate has a moisture vapor transmission rate greater than about 2000 g/m²/day.

3. The method of claim 1, further comprising orienting said thermally protective laminate such that said flame resistant, thermally stable textile is subjected to a heat source when tested for TPP.

4. The method of claim 1, wherein the flame resistant, thermally stable textile comprises meta-aramid, para-aramid, or blends thereof.

5. The method of claim 1, wherein the flame resistant, thermally stable textile comprises PBI, PBO, modacrylic, FR cotton, FR rayon and blends thereof.

6. The method of claim 1, wherein the polymer resin of the polymer resin-expandable graphite mixture is elastomeric.

7. The method of claim 1, wherein the polymer resin of the polymer resin-expandable graphite mixture comprises polyurethane.

8. The method of claim 1, wherein the polymer resin-expandable graphite mixture is applied as discrete dots on the surface of the first convective barrier.

9. The method of claim 1, wherein the polymer resin-expandable graphite mixture is applied as dots to less than 50% of the surface area of the first convective barrier.

10. The method of claim 1, wherein the polymer resin-expandable graphite mixture is applied as dots to less than about 35% of the surface area of the first convective barrier with approximately 2000 microns or greater spacing between said dots.

11. The method of claim 1, wherein said active insulation is positioned away from a heat source when said laminate is tested for TPP.

12. The method of claim 1, wherein said thermally protective laminate has a CLO value less than about 0.45.

13. The method of claim 1, further comprising positioning a textile backer to said polymer resin-expandable graphite mixture.

14. The method of claim 13, wherein said polymer resin-expandable graphite mixture adheres said textile backer to said first convective barrier.

15. The method of claim 1, further comprising the step of forming the polymer resin-expandable graphite mixture by melting or dissolving a polymer resin and mixing an expandable graphite in the melted or dissolved polymer resin before applying the polymer resin-expandable graphite mixture to the first convective barrier.

16. The method of claim 1, further comprising adhering a textile backer to said second convective barrier.

17. A method for increasing the thermal protective performance (TPP) of a thermally protective laminate compared to the laminate without an active insulation, said method comprising:
    disposing an active insulation comprising a polymer resin-expandable graphite mixture discontinuously between a first convective barrier and a second convective barrier to form an active insulation-convective barrier composite; and
    joining a flame resistant, thermally stable textile to said active insulation-convective barrier composite to form a thermally protective laminate having a TPP increase of at least 3 cal/cm²,
    wherein the TPP of the laminate is increased without substantially increasing the CLO value of the laminate.

18. The method of claim 17, further comprising orienting said thermally protective laminate such that said flame resistant, thermally stable textile is subjected to a heat source when tested for TPP.

19. The method of claim 17, wherein at least one of said first convective barrier and said second convective barrier is polytetrafluoroethylene or expanded polytetrafluoroethylene.

20. The method of claim 17, wherein said first convective barrier and said second convective barrier are polytetrafluoroethylene or expanded polytetrafluoroethylene.

21. The method of claim 17, wherein said thermally protective laminate has a moisture vapor transmission rate greater than about 2000 g/m²/day.

22. The method of claim 17, further comprising positioning a textile backer to said second convective barrier.

23. The method of claim 17, wherein the flame resistant, thermally stable textile comprises meta-aramid, para-aramid, or blends thereof.

24. The method of claim 17, wherein the flame resistant, thermally stable textile comprises PBI, PBO, modacrylic, FR cotton, FR rayon and blends thereof.

25. The method of claim 17, wherein the polymer resin of the polymer resin-expandable graphite mixture is elastomeric.

26. The method of claim 17, wherein the polymer resin of the polymer resin-expandable graphite mixture comprises polyurethane.

27. A method for increasing the thermal protective performance (TPP) of an ensemble compared to the ensemble without an active insulation, said method comprising:

forming a moisture barrier by discontinuously applying an active insulation comprising a polymer resin-expandable graphite mixture to a surface of a convective barrier and adhering a flame resistant, thermally stable textile to said convective barrier on a side opposing said polymer resin-expandable graphite mixture wherein said convective barrier comprises a monolithic polymer layer sandwiched between two convective barrier layers, each said convective barrier comprising expanded polytetrafluoroethylene or polytetrafluoroethylene;

positioning a thermal liner on said polymer resin-expandable graphite mixture;

adhering a shell layer to said thermally stable textile to form an ensemble, wherein the thermal protective performance of said ensemble is increased by at least 2.0 cal/cm$^2$ per approximately 35 gsm of said polymer resin-expandable graphite mixture.

28. The method of claim 27, wherein the TPP of the ensemble is increased by at least about 5 cal/cm$^2$ compared to the ensemble without the active insulation.

29. The method of claim 27, wherein the TPP of the ensemble is increased by at least about 10 cal/cm$^2$ compared to the ensemble without the active insulation.

30. The method of claim 27, wherein the flame resistant, thermally stable textile comprises meta-aramid, para-aramid, or blends thereof.

31. The method of claim 27 wherein the flame resistant, thermally stable textile comprises PBI, PBO, modacrylic, FR cotton, FR rayon and blends thereof.

* * * * *

UNITED STATES PATENT AND TRADEMARK OFFICE
CERTIFICATE OF CORRECTION

PATENT NO.          : 8,722,145 B2                               Page 1 of 1
APPLICATION NO.     : 12/869297
DATED               : May 13, 2014
INVENTOR(S)         : Dattatreya Panse and Klaus Meindl It is certified that error appears in the above-identified patent and that said Letters Patent is hereby corrected as shown below:

In the Specification
At column 2, lines 11-13: change "FIG. 9*b* is a schematic illustration of one embodiment of a pattern of . . . applied in a grid." to -- FIG. 9*b* is a schematic illustration of a polymer resin-expandable graphite applied in a grid. --
At column 4, line 34: change "that" to -- than --
At column 4, line 43: change "then" to -- than --
At column 5, line 33: change "resin" to -- resins --
At column 5, line 58: change "form" to -- forms --
Al column 7, line 12: change "reduces" to -- reduce --
At column 8, line 60: change "the zero" to -- to zero --
At column 9, lines 12 and 14: change "300 C" to -- 300° C --
At column 10, lines 15 and 58: change "yd2" to -- $yd^2$ --
At column 10, lines 37, 38, 47, and 51: change "cm2" to -- $cm^2$ --
At column 11, line 6: change "has" to -- have --
At column 11, lines 20 and 50: change "cm2" to -- $cm^2$ --
At column 11, lines 26 and 56: change "a" to -- an --
At column 11, line 30: change "yd2" to -- $yd^2$ --
At column 11, line 46: change "dy2" to -- $yd^2$ --
At column 12, line 39: change "dy2" to -- $yd^2$ --
At column 12, line 43: change "cm2" to -- $cm^2$ --
At column 12, line 50: change "yd2" to -- $yd^2$ --

Signed and Sealed this
Second Day of September, 2014

Michelle K. Lee
*Deputy Director of the United States Patent and Trademark Office*